(12) United States Patent
Kerkhoff et al.

(10) Patent No.: US 7,533,490 B2
(45) Date of Patent: May 19, 2009

(54) METHOD FOR CREATING A VERIFIED FOOD SOURCE

(75) Inventors: Daniel P. Kerkhoff, West Lafayette, IN (US); Daniel B. Knoll, Grafton, IL (US)

(73) Assignee: Innovated Agricultural Concepts, LLC, West Lafayette, IN (US)

( * ) Notice: Subject to any disclaimer, the term of this patent is extended or adjusted under 35 U.S.C. 154(b) by 506 days.

(21) Appl. No.: 11/172,328

(22) Filed: Jun. 30, 2005

(65) Prior Publication Data

US 2007/0000168 A1 Jan. 4, 2007

(51) Int. Cl.
*A01G 1/00* (2006.01)
(52) U.S. Cl. .................................. 47/58.1 R
(58) Field of Classification Search ............. 47/58.1 R, 47/58.1 FV; 119/51.01; 424/442
See application file for complete search history.

(56) References Cited

U.S. PATENT DOCUMENTS

| | | | |
|---|---|---|---|
| 4,918,104 A | 4/1990 | Weiss et al. | |
| 5,246,717 A | 9/1993 | Garwin | |
| 5,478,990 A | 12/1995 | Montanari et al. | |
| 5,673,647 A | 10/1997 | Pratt | |
| 6,095,915 A | 8/2000 | Geissler et al. | |
| 6,162,974 A | 12/2000 | Martin | |
| 6,177,121 B1 | 1/2001 | Elkin et al. | |
| 6,436,451 B1 | 8/2002 | Slaugh | |
| 6,474,500 B1 | 11/2002 | Carr | |
| 6,659,039 B1 | 12/2003 | Larsen | |
| 6,664,897 B2 | 12/2003 | Pape et al. | |
| 6,805,886 B2 | 10/2004 | Slaugh | |
| 6,859,672 B2 | 2/2005 | Roberts et al. | |
| 6,874,000 B2 | 3/2005 | Sholl et al. | |
| 6,878,052 B2 | 4/2005 | Andersson | |
| 6,895,893 B2 | 5/2005 | Larsen | |
| 6,898,482 B2 | 5/2005 | Thorvaldsson et al. | |
| 2001/0010918 A1 | 8/2001 | O'Connor | |
| 2003/0183175 A1 | 10/2003 | Fuqua | |
| 2004/0103847 A1 | 6/2004 | Larsen | |

FOREIGN PATENT DOCUMENTS

| CN | 1718079 | 1/2006 |
|---|---|---|
| JP | 63237745 | 10/1988 |

OTHER PUBLICATIONS

International Search Report dated Nov. 23, 2006, issued on related PCT Patent Application PCT/US2006/025867.

*Primary Examiner*—T. Nguyen
(74) *Attorney, Agent, or Firm*—Lathrop & Gage LLP (57) ABSTRACT

A method for creating a verified food source comprises planting verified seed in accordance with planting protocols to create a crop, growing the crop in accordance with crop protocols, harvesting the crop in accordance with harvest protocols to obtain grain, storing the grain in accordance with storage protocols, inspecting the grain to identify grain that meets predetermined grain standards, verifying the grain that meets the predetermined grain standards, feeding the verified grain to a certified food source, fostering the food source in accordance with fostering protocols, inspecting the food source to identify food source that meets the fostering protocols, and verifying the food source that meets the fostering protocols.

2 Claims, 6 Drawing Sheets

| Minimum distance between the corn crop and corn outside the corn crop | Acceptable number of buffer rows |
|---|---|
| 680 feet | 0 or more |
| 420 feet | 6 or more |
| 220 feet | 12 or more |
| 80 feet | 16 or more |

METHOD FOR CREATING A VERIFIED FOOD SOURCE

BACKGROUND AND SUMMARY OF THE INVENTION

This invention relates generally to a method for creating a verified food source.

Multiple references may be found in the prior art that disclose methods of recording and accessing data so that a food source's history may be reviewed after a problem has been detected with the food source. While these disclosures may be useful in stopping disease outbreaks, locating contaminated food sources, and sometimes locating a source of contamination, it would be much more efficient and safe to verify the food source and detect problems earlier. Further, as technologies used in the foods industries continue to rapidly evolve, many people want to know the direct history of food before they eat it.

In response to this need, a method has been devised to create a verified food source (a food source having ensured traits). According to this inventive method, a verified food source may be "natural", or it may include extraordinary traits through the transfer of genetic properties from verified seed to the verified food source. "Food" as used herein is inclusive of drink as well as traditional solid food.

A method for creating a verified food source according to the present invention comprises planting verified seed in accordance with planting protocols to create a crop, growing the crop in accordance with crop protocols, harvesting the crop in accordance with harvest protocols to obtain grain, storing the grain in accordance with storage protocols, inspecting the grain to identify grain that meets predetermined grain standards, verifying the grain that meets the predetermined grain standards, feeding the verified grain to a certified food source, fostering the food source in accordance with fostering protocols, inspecting the food source to identify food source that meets the fostering protocols, and verifying the food source that meets the fostering protocols.

DESCRIPTION OF THE PREFERRED EMBODIMENT

A method for creating a verified food source according to the present invention will now be described in detail with reference to FIGS. 1 through 10 of the accompanying drawings.

Figure 1:
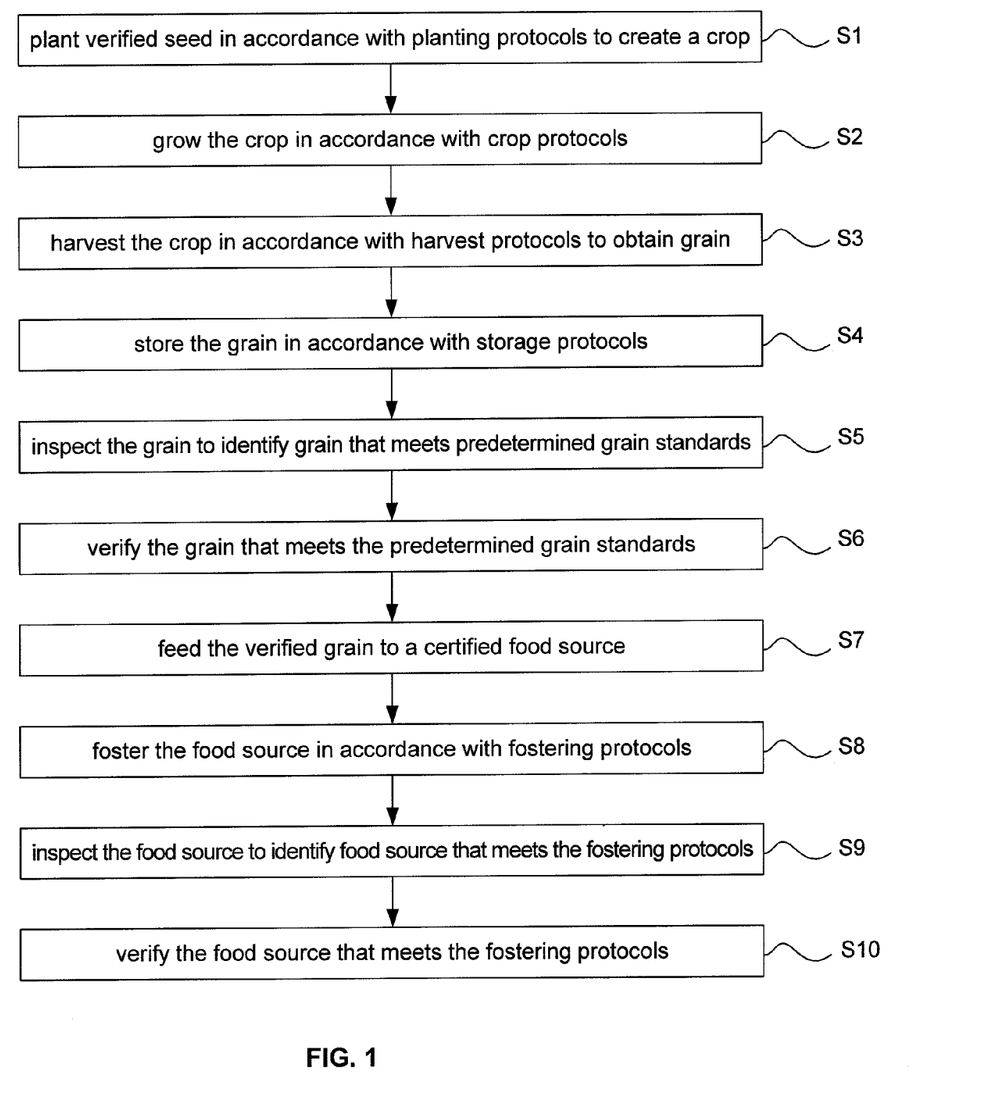
FIG. 1 shows a flow chart illustrating a method for creating a verified food source according to one embodiment of the present invention.

FIG. 1 shows a flow chart illustrating a method 100 for creating a verified food source 140. At step S1, verified seed 110 is planted in accordance with planting protocols 112 to create a crop 120. Verified seed 110 is seed having certified identity and purity.

Figure 3:
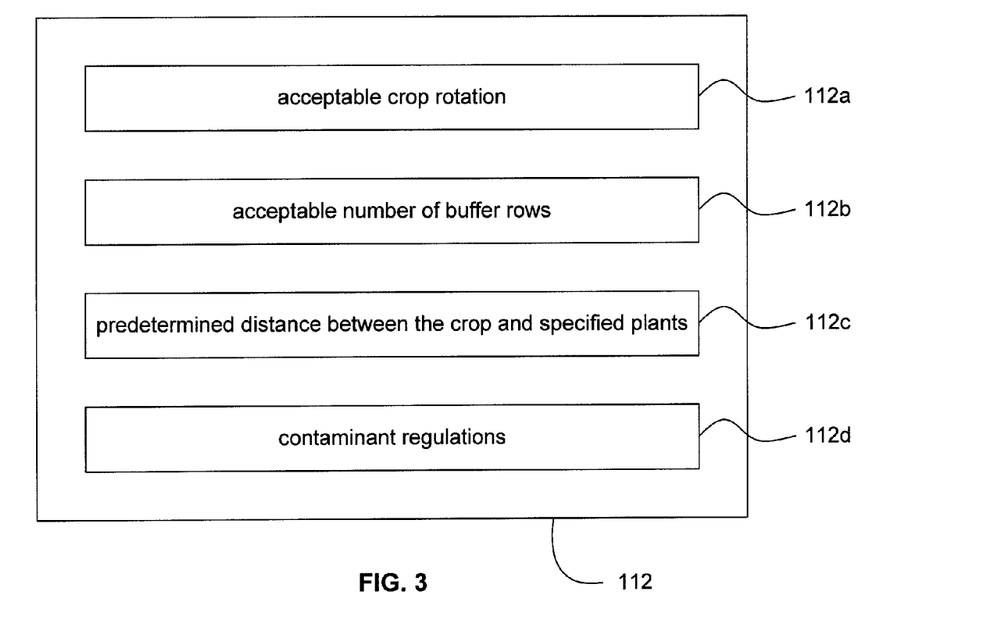
FIG. 3 shows a block diagram illustrating planting protocols.
Figure 4:
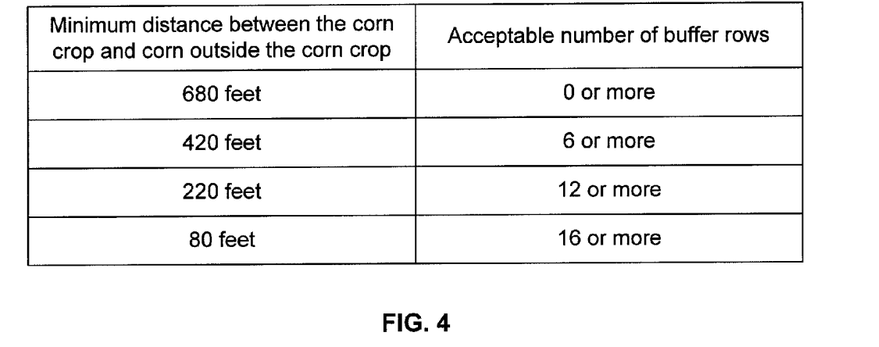
FIG. 4 shows a table of acceptable number of buffer rows corresponding to a minimum distance between a corn crop and corn outside the corn crop.

The planting protocols 112 may include any protocols intended to ensure the identity, purity, and productivity of the planted seed 110. As shown in FIG. 3, the planting protocols 112 preferably include an acceptable crop rotation 112a (such as corn or soybeans, alfalfa, wheat, and sorghum or barley,) an acceptable number of buffer rows 112b, a predetermined distance 112c between the crop 120 and specified plants (such as 680 feet between a corn crop 120 and popcorn or sweet corn), and contaminant regulations 112d. The buffer rows 112b restrict the crop 120 from cross-pollinating with other plants and crops, and a preferred number of acceptable buffer rows 112b for a corn crop 120 are shown in FIG. 4. If the minimum distance between the corn crop 120 and corn outside the corn crop 120 is 620 feet, 420 feet, 220 feet, or 80 feet, respectively, the corresponding acceptable minimum number of buffer rows is preferably 0, 6, 12, or 16, respectively, as shown in FIG. 4. The contaminant regulations 112d preferably require all implements, machinery, and facilities directly involved with the seed 110 to be kernel clean. "Kernel clean" means free from foreign grain and contaminants. The method 100 then proceeds to step S2.

Figure 5:
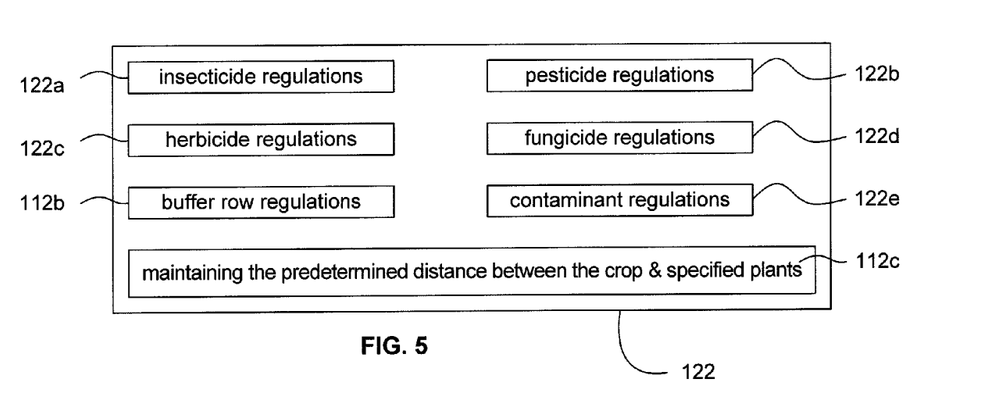
FIG. 5 shows a block diagram illustrating crop protocols.

At step S2, the crop 120 is grown in accordance with crop protocols 122 intended to ensure the identity, purity, and productivity of the crop 120. The crop protocols 122 may include regulations regarding adding any substance to the crop 120. As shown in FIG. 5, the crop protocols 122 preferably include insecticide regulations 122a, pesticide regulations 122b, herbicide regulations 122c, fungicide regulations 122d, contaminant regulations 122e, maintaining the buffer rows 112b, and maintaining the predetermined distance 112c between the crop 120 and specified plants. The contaminant regulations 122e are preferably an extension of the contaminant regulations 112d and preferably require that all implements and machinery directly involved with the crop 120 be kernel clean. The method then proceeds to step S3.

Figure 6:
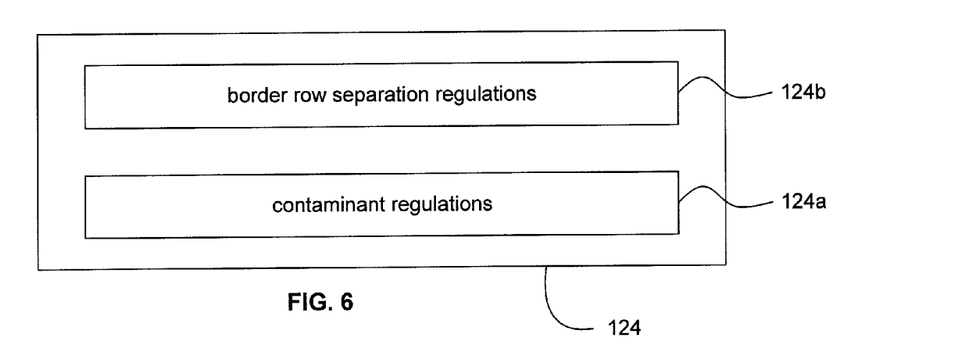
FIG. 6 shows a block diagram illustrating harvest protocols.

At step S3, the crop 120 is harvested in accordance with harvest protocols 124 to obtain grain 130. As shown in FIG. 6, the harvest protocols 124 preferably include contaminant regulations 124a and regulations 124b requiring grain from the buffer rows 112b to be permanently separated from the grain from the crop 120. The grain from the buffer rows 112b may be used or sold, but it may not be referred to as the grain 130 from the crop 120 and may not be verified. The contaminant regulations 124a are preferably an extension of the contaminant regulations 112d and preferably require that all implements and machinery directly involved with harvesting the crop 120 be kernel clean. The method then proceeds to step S4.

Figure 7:
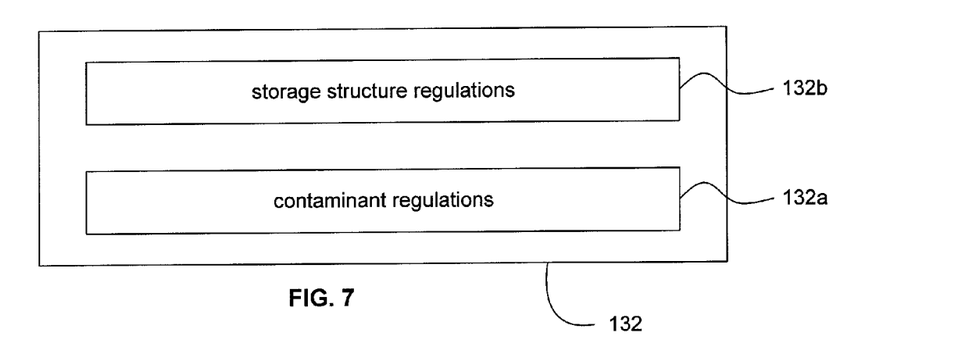
FIG. 7 shows a block diagram illustrating storage protocols.

At step S4, the grain 130 harvested from the crop 120 is stored in accordance with storage protocols 132. As shown in FIG. 7, the storage protocols 132 preferably include contaminant regulations 132a and storage structure regulations 132b.

The contaminant regulations 132a are preferably an extension of the contaminant regulations 124a and preferably require that all implements, machinery, and facilities directly involved with transporting and storing the grain 130 be kernel clean. The storage structure regulations 132b are preferably focused on the physical location where the grain 130 is stored, and the storage structure regulations 132b preferably require a sound foundation and sidewalls to restrict contamination by insects and rodents, a good roof and watershed to protect the grain 130 from water damage and rot, and a safe and efficient apparatus for expulsion of the grain 130. The method then proceeds to step S5.

Figure 8:
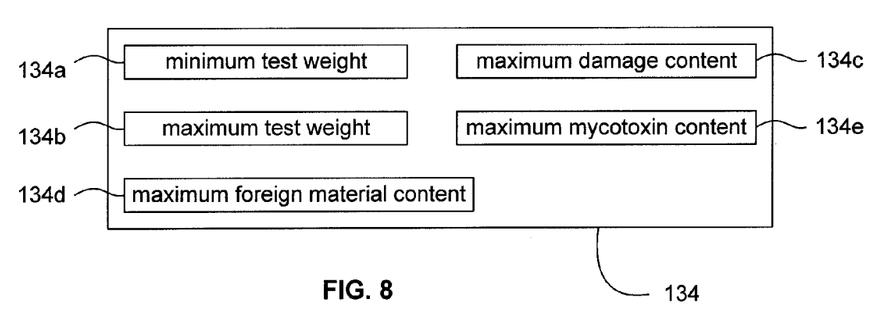
FIG. 8 shows a block diagram illustrating predetermined grain standards.

At step S5, the grain 130 is inspected to identify grain 130 that meets predetermined grain standards 134. The predetermined grain standards 134 are a set of predetermined criteria used to judge and grade the grain 130. As shown in FIG. 8, the predetermined grain standards 134 preferably include a minimum test weight 134a, a maximum moisture content 134b, a maximum damage content 134c, a maximum foreign material content 134d, and a maximum mycotoxin content 134e. For a corn crop 130, for example, the minimum test weight 134a is preferably 56 lbs/bushel, the maximum moisture content is preferably fifteen percent, the maximum damage content is preferably four percent, and the maximum foreign material content is preferably three percent. The method then proceeds to step S6.

At step S6, the grain 130 that meets the predetermined grain standards 134 is verified. The method then proceeds to step S7.

At step S7, the verified grain 130 is fed to a certified food source 140. A certified food source 140 is a food source having certified identity. The method then proceeds to step S8.

Figure 9:
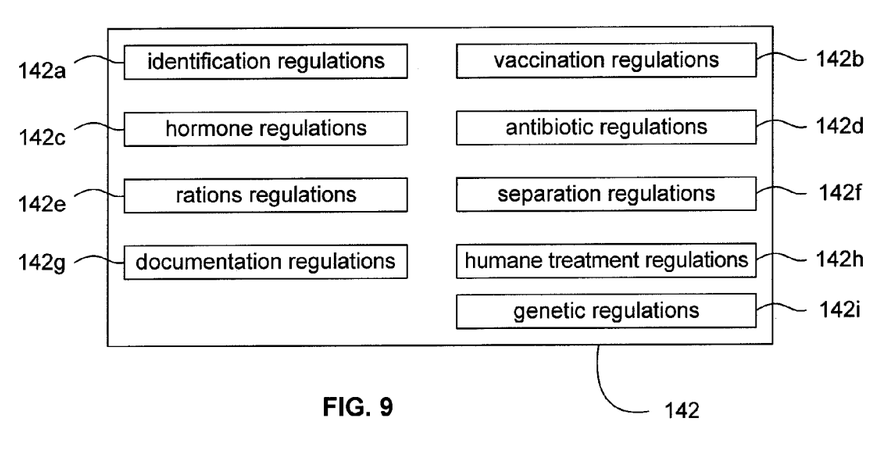
FIG. 9 shows a block diagram illustrating fostering protocols.
Figure 10:
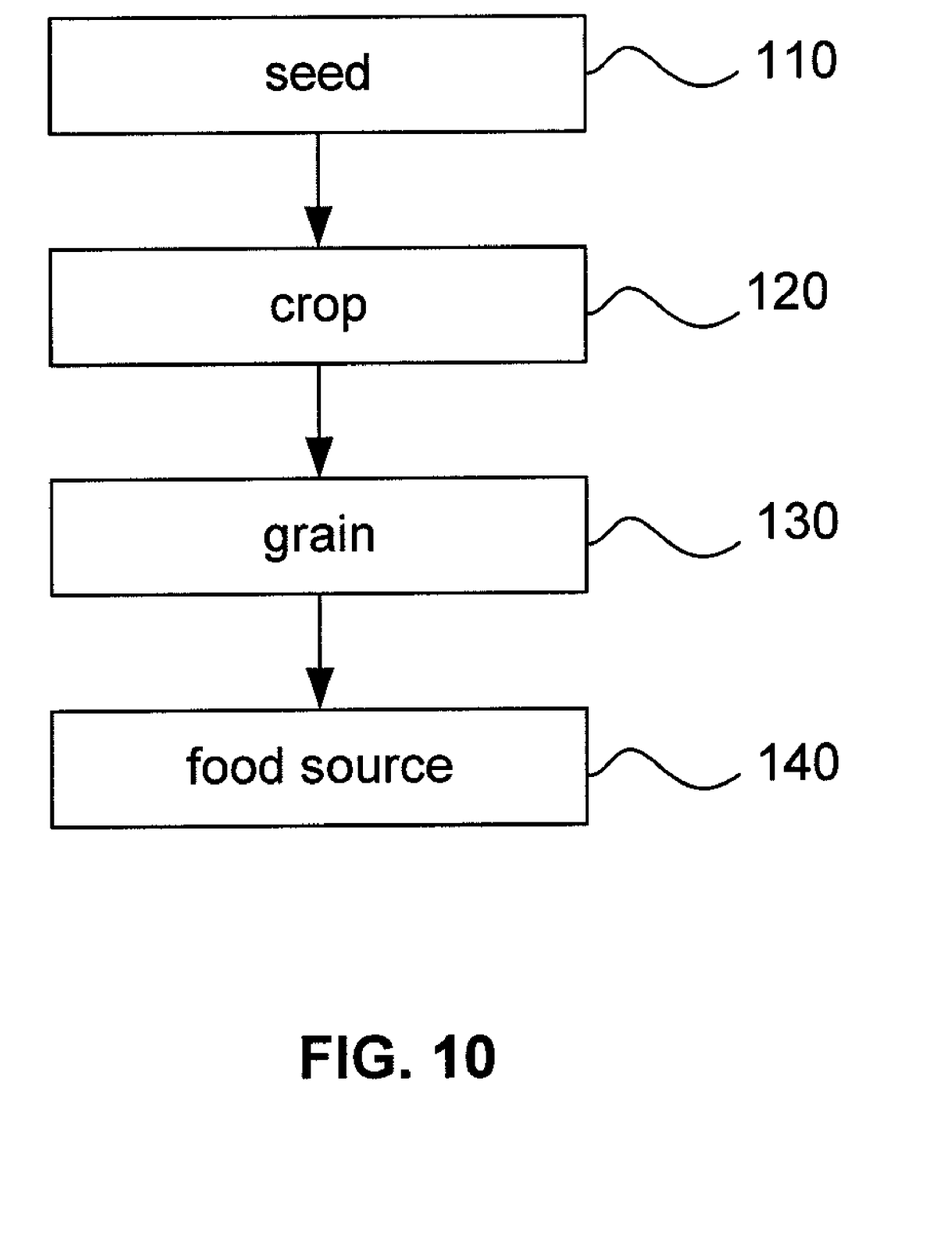
FIG. 10 shows a flow chart illustrating the progression from seed to crop to grain to food source.

At step S8, the food source 140 is fostered in accordance with fostering protocols 142. As shown in FIG. 9, the fostering protocols 142 preferably include identification regulations 142a, vaccination regulations 142b, hormone regulations 142c, antibiotic regulations 142d, rations regulations 142e, separation regulations 142f, documentation regulations 142g, and humane treatment regulations 142h. The identification regulations 142a preferably require the food source 140 to be identified, such as by ear tag or electronic identification, at all times. The vaccination regulations 142b may place requirements on what vaccinations must, may, or may not be administered to the food source 140 at different times. The hormone regulations 142c may place requirements on what hormones must, may, or may not be administered to the food source 140. The antibiotic regulations 142d may place requirements on what antibiotics may or may not be administered to the food source 140. The rations regulations 142e may place requirements on what feed and how much feed may be fed to the food source 140. It is to be understood that the food source 140 may be fed a combination of various verified grains 130. The separation regulations 142f may place requirements on when the food source 140 must be separated from other food source 140, such as due to disease, making the separated food source 140 no longer eligible to be verified. The documentation regulations 142g may require various information to be documented, such as where vaccinations were purchased, the name of the vaccination, the lot or serial number of the vaccination, dates the vaccination was administered, locations where the vaccination was administered, etc. The humane treatment regulations 142h preferably require the food source 140 to be treated humanely, such as by prohibiting cattle prods and electric shockers. The genetic regulations 142i may place requirements on what genetic materials must, may, or may not be administered to the food source 140. The method then proceeds to step S9.

At step S9, the food source 140 is inspected to identify food source 140 that meets the fostering protocols 142. The method then proceeds to step S10.

At step S10, the food source 140 that meets the fostering protocols 142 is verified.

Figure 2:
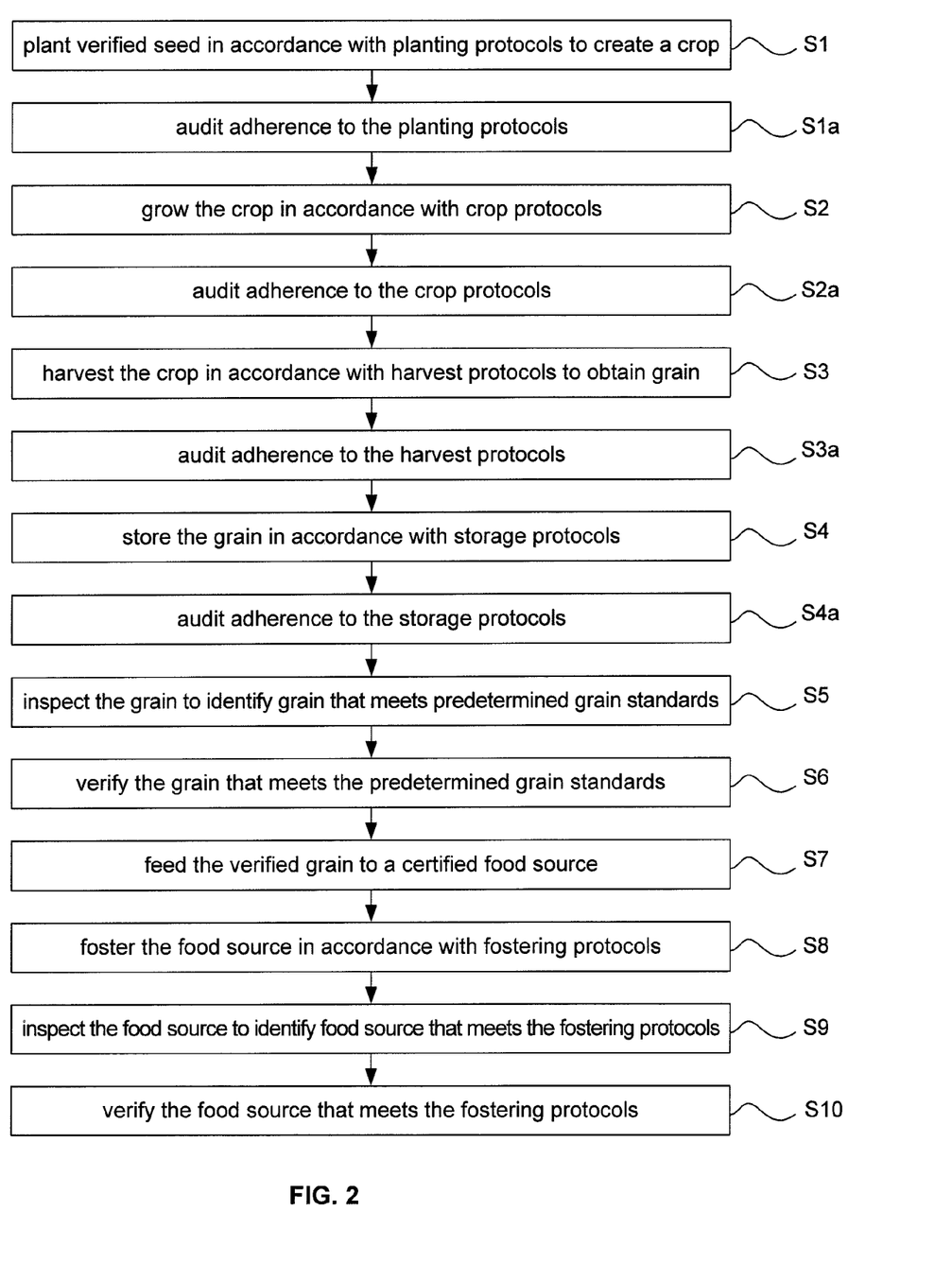
FIG. 2 shows a flow chart illustrating a method for creating a verified food source according to another embodiment of the present invention.

FIG. 2 shows another flow chart illustrating the method 100 for creating the verified food source 140. At step S1a, adherence to the planting protocols 112 is audited. At step S2a, adherence to the crop protocols 122 is audited. At step S3a, adherence to the harvest protocols 124 is audited. At step S4a, adherence to the storage protocols 132 is audited. These audits may occur with or without notice and are intended to ensure that the protocols 112, 122, 124, 132 are followed and to detect lapses therein. It is important to note that these audits may occur multiple times and at various steps of the method 100. For example, adherence to the storage protocols 132 may be audited before the grain 130 is stored at step S4 as well as after the grain 130 is stored at step S4.

Utilizing the method 100 creates a food source 140 having ensured traits. This is beneficial in numerous ways. For example, a history of the food source 140 need not be reviewed to control a disease outbreak because the food source 140 has undergone the verification process. For another example, the food source 140 may be undoubtedly raised according to desired standards set by the protocols 112, 122, 124, 132, 142. This means that the food source 142 may be fed grain 130 having a desired identity and purity and that the food source 142 may be fostered hormone-free, antibiotic-free, with synthetic hormones, etc. If the food source 140 were bovine, for example, the animal may be raised "naturally" (free of synthetic hormones, antibiotics, pesticides, etc.) or in a manner that produces desirable extraordinary traits in meat, milk, or another consumable product. Meat high in omega-3 fatty acids, for example, may be produced by following the method 100 using a corn seed that produces a corn grain 130 higher in omega-3 fatty acids than occurs naturally. In other words, the method 100 may provide a verified transfer of genetic properties from seed 110 to the food source 140.

It is understood that while certain forms of this invention have been illustrated and described, it is not limited thereto except insofar as such limitations are included in the following claims and allowable functional equivalents thereof.

What is claimed is as follows:

1. A method for creating a verified food source, comprising:
    planting verified seed in accordance with planting protocols to create a crop;
    growing the crop in accordance with crop protocols;
    harvesting the crop in accordance with harvest protocols to obtain grain;
    storing the grain in accordance with storage protocols;
    inspecting the grain to identify grain that meets standards addressing test weight, moisture content, damage content, foreign material content, and mycotoxin content;
    verifying the grain that meets the standards addressing test weight, moisture content, damage content, foreign material content, and mycotoxin content;
    feeding the verified grain to a certified food source;
    fostering the food source in accordance with fostering protocols;
    inspecting the food source to identify food source that meets the fostering protocols;
    verifying the food source that meets the fostering protocols;

auditing adherence to the planting protocols;
auditing adherence to the crop protocols;
auditing adherence to the harvest protocols; and
auditing adherence to the storage protocols;
wherein the planting protocols include:
- providing sufficient buffer rows of plants and a sufficient distance between the crop and plants beyond the buffer rows to restrict the crop from cross-pollinating with other plants; and
- contaminant regulations requiring all machinery used in planting the verified seed to be kernel clean;

wherein the crop protocols include:
- insecticide regulations;
- pesticide regulations;
- herbicide regulations;
- fungicide regulations;
- maintaining the buffer rows; and
- maintaining the contaminant regulations;

wherein the harvest protocols include contaminant regulations requiring all machinery used in harvesting the crop to be kernel clean;

wherein the harvest protocols require grain from the buffer rows to be permanently separated from the grain from the crop;

wherein the storage protocols include storage structure regulations and contaminant regulations;

wherein the fostering protocols include:
- identification regulations;
- vaccination regulations;
- hormone regulations;
- antibiotic regulations;
- rations regulations;
- separation regulations;
- documentation regulations;
- genetic regulations; and
- humane treatment regulations;

wherein the verified food source is bovine;
wherein the verified seed causes the resulting verified grain to be higher in omega-3 fatty acids than occurs naturally
wherein the abnormally-high level of omega-3 fatty acids is transferred from the verified grain to the food source.

2. The method of claim 1, wherein the crop is a corn crop.

* * * * *

UNITED STATES PATENT AND TRADEMARK OFFICE
CERTIFICATE OF CORRECTION

PATENT NO. : 7,533,490 B2  Page 1 of 1
APPLICATION NO. : 11/172328
DATED : May 19, 2009
INVENTOR(S) : Daniel P. Kerkhoff et al.

It is certified that error appears in the above-identified patent and that said Letters Patent is hereby corrected as shown below:

Title page, Item (73) Assignee, "Innovated Agricultural Concepts, LLC" should read --Innovative Agricultural Concepts, LLC--

Signed and Sealed this

Ninth Day of November, 2010

David J. Kappos
*Director of the United States Patent and Trademark Office*